Dec. 29, 1959  J. C. OESCH  2,918,748
TRAP ANCHOR
Filed Nov. 7, 1957

INVENTOR.
JOSEPH C. OESCH
BY Charles L. Lovercheck
ATTORNEY

# United States Patent Office 2,918,748
Patented Dec. 29, 1959

2,918,748
TRAP ANCHOR
Joseph C. Oesch, Centerville, Pa.
Application November 7, 1957, Serial No. 695,114
1 Claim. (Cl. 43—96)

This invention relates to anchors and, more particularly, to anchors for anchoring an animal trap.

In the trapping of animals, it is often desirable to anchor the trap to an object which is inconspicuous and which will not attract the attention of the animal and, therefore, warn it of the presence of the trap and its potential danger. It is often impossible to find a suitable natural object for attaching the trap and resort must be had to other artificial means.

Stakes driven into the ground with a piece thereof projecting above the ground are a common means of anchoring traps but these devices are usually conspicuous to the animal and are inconvenient to use. Various anchors which are driven below the surface of the ground have been proposed. Some of these anchors have been ineffective as such because they have been of such a shape that they do not anchor themselves securely into the ground. Others have been objectionable for other reasons.

The device herein disclosed has utility in many environments; for example, as a tent stake, as an anchor for a fence post or pole line post, and many other uses as well as for a trap anchor.

It is, accordingly, an object of this invention to provide a trap anchor which overcomes the disadvantages in prior anchors and, more particularly, it is an object of the invention to provide an anchor means which is simple in construction, economical to manufacture, and simple and efficient to use.

Another object of the invention is to provide an anchor means for animal traps wherein the anchor itself is completely obscured below the surface of the ground when it is in use.

A further object of the invention is to provide an anchor which is simple to store and to transport.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

Fig. 1 is a view of an animal trap anchor according to the invention shown in an anchoring position in the ground;

Fig. 2 is a front view of the anchor shown in Fig. 1;

Fig. 3 is a view of the device for driving the anchor into the ground; and

Fig. 4 is a side view of the trap anchor according to the invention.

Now with more specific reference to the drawing wherein like numerals identify similar parts of the device which constitutes the invention, an anchor for an animal trap is shown in Figs. 1 and 2 with the device for driving it shown in Fig. 3.

The anchor is made up of a plate like body member 10 having a flat surface 11 with the upper end of the body 10 curved at 13 and having an end 12 which comprises legs 30 and 31. The portion 13 extends generally at right angles to a flat portion 14. The side edges of the body 10 are tapered at 15 toward a narrow portion or point 16 in order to cause the device to be easily inserted into the ground. The upper end of the body 10 has a notch 17 therein with the curved legs 30 and 31 on each side thereof. The notch 17 is adapted to receive the notched end 18 with legs 32 and 33 overlying the body 10, the legs 30 and 31 receiving a driving member 19 therebetween during the driving operation.

The driving member 19 has an end 20 to which may be applied a hammer or the like to drive the anchor into the ground with the driving member 19 in proper position. The notched end 18 is received in the notch 17 with the legs 32 and 33 receiving the body 10 of the anchor so that the anchor may be driven far below the surface of the ground as shown in Fig. 1. It will be noted that the notch 17 terminates slightly short of the straight portion of the body 10.

A hole 21 is formed in the center of the body 10 and receives an eye 22 to which may be attached a chain 26. Therefore, when the trap anchor is driven into the ground as shown in Fig. 1, it will enter through the opening in the ground 23 and after the anchor has been driven to the position shown in dotted lines in Fig. 1, the driving member 19 may be removed therefrom and the anchor will be completely embedded in the ground as shown in dotted lines in Fig. 1. The operator may then pull up on the chain 26. As the operator exerts sufficient force on the chain 26, the curved legs 30 and 31 will engage the side of the opening in the ground 23 and guide the body 10 to the position shown in full lines in Fig. 1. Thus, in order to remove the anchor, the entire mass of soil above the anchor must be lifted.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

An anchor adapted to be driven into the ground comprising a flat plate shaped body bent at one end to form a curved portion, said curved portion terminating in an end disposed at substantially ninety degrees to said flat body and having a rectangular notch formed in said curved portion and extending through said curved portion to said flat body with the parts of said curved portion on each side of said notch defining legs, and fastening means on said flat body adapted to be attached to a device to be anchored, said fastening means being disposed on the side of said flat body opposite the side toward which said curved portion extends whereby said body, when pulled by said fastening means, will move to a horizontal position guided by said curved portion, said anchor being adapted to be driven by a tool comprising an elongated handle having an impact tool engaging end and a notched end opposite said impact tool engaging end, said notch on said tool receiving a portion of said body below said rectangular notch, said tool being received by said notch in said body whereby said body may be driven into the ground, said body being guided to a generally horizontal position by said curved portion thereof when an upward force is exerted on said fastening means after said body has been driven into the ground.

References Cited in the file of this patent
UNITED STATES PATENTS

| | | |
|---|---|---|
| 364,390 | Wright | June 7, 1887 |
| 768,705 | Swan | Aug. 30, 1904 |
| 795,649 | Robinson | July 25, 1905 |
| 936,824 | Simpson et al. | Oct. 12, 1909 |
| 1,748,878 | Hahn | Feb. 25, 1930 |
| 1,821,125 | Thom | Sept. 1, 1931 |